US011847655B1

(12) United States Patent
Soldahl

(10) Patent No.: US 11,847,655 B1
(45) Date of Patent: Dec. 19, 2023

(54) MULTI-VECTOR SUSPICIOUS ACTIVITY IDENTIFIER

(71) Applicant: Jumio Corporation, Palo Alto, CA (US)

(72) Inventor: Lars Soldahl, Antioch, CA (US)

(73) Assignee: Jumio Corporation, Sunnyvale, CA (US)

( * ) Notice: Subject to any disclaimer, the term of this patent is extended or adjusted under 35 U.S.C. 154(b) by 0 days.

(21) Appl. No.: 17/491,482

(22) Filed: Sep. 30, 2021

(51) Int. Cl.
*G06Q 20/40* (2012.01)

(52) U.S. Cl.
CPC ....... *G06Q 20/4016* (2013.01); *G06Q 20/405* (2013.01)

(58) Field of Classification Search
None
See application file for complete search history.

(56) References Cited

U.S. PATENT DOCUMENTS

| | | | |
|---|---|---|---|
| 2019/0295085 A1* | 9/2019 | Ashiya | G06Q 20/3823 |
| 2020/0151825 A1* | 5/2020 | Cohen | G06N 5/04 |
| 2020/0226460 A1* | 7/2020 | Bruss | G06F 16/254 |
| 2020/0311736 A1* | 10/2020 | Song | G06Q 20/38215 |
| 2021/0065191 A1* | 3/2021 | De Shetler | G06N 20/00 |
| 2021/0142329 A1* | 5/2021 | Aparicio | G06N 5/025 |
| 2022/0012742 A1* | 1/2022 | Kielak | G06N 3/08 |
| 2022/0020026 A1* | 1/2022 | Wadhwa | G06N 5/022 |
| 2022/0101192 A1* | 3/2022 | Patel | G06N 7/01 |

OTHER PUBLICATIONS

Aparicio, et al., ARMS: Automated rules management system for fraud detection, Feb. 2020, retrieved from https://www.researchgate.net/publication/339301004_ARMS_Automated_rules_management_system_for_fraud_detection (Year: 2020).*

* cited by examiner

*Primary Examiner* — Gregory S Cunningham, II
(74) *Attorney, Agent, or Firm* — Patent Law Works LLP

(57) ABSTRACT

The disclosure includes a system and method for receiving, using one or more processors, monitoring data; preprocessing, using one or more processors, the monitoring data based on a plurality of vectors, the plurality of vectors including a first vector; applying, using the one or more processors, a first rule associated with the first vector; and triggering, using the one or more processors, a first action based on the first rule.

16 Claims, 9 Drawing Sheets

MULTI-VECTOR SUSPICIOUS ACTIVITY IDENTIFIER

BACKGROUND

Many entities, e.g., financial institutions, have a vested interest in identifying and curtailing suspicious activity. Suspicious activity may be indicative of one or more forms of malfeasance, which may include crimes. For example, the suspicious activity may be indicative of fraud or identity theft, which a bank may seek to thwart. As another example, the suspicious activity may be one or more transactions suspected of being money laundering. Money laundering is a process by which proceeds of criminal conduct are made to appear as proceeds from a legitimate source.

SUMMARY

This specification relates to methods and systems for receiving, using one or more processors, monitoring data; preprocessing, using one or more processors, the monitoring data based on a plurality of vectors, the plurality of vectors including a first vector; applying, using the one or more processors, a first rule associated with the first vector; and triggering, using the one or more processors, a first action based on the first rule.

Other implementations of one or more of these aspects include corresponding systems, apparatus, and computer programs, configured to perform the actions of the methods, encoded on computer storage devices.

These and other implementations may each optionally include one or more of the following features. For instance, the preprocessing of the monitoring data based on a plurality of vectors comprises: applying, for each vector, a vector-specific schema to the monitoring data; and generating one or more vector-specific monitoring features based on the monitoring data. For instance, the plurality of vectors comprises one or more of a transaction vector, an account vector, a party vector, a payment source vector, a position vector, and a location vector, and the first vector is one of the transaction vector, the account vector, the party vector, the payment source vector, the position vector, and the location vector. For instance, the first action triggers a second rule, wherein the second rule is associated with a second vector, the second vector included in the plurality of vectors, and the actions may further comprise: triggering a second action based on the second rule; and generating one or more vector-specific monitoring features based on the monitoring data. For instance, the actions may further include traversing a first set of vectors a number of layers deep; generating a linkage model based on traversing the first set of vectors the number of layers deep; and identifying a pattern, wherein the pattern is a wash cycle. For instance, the actions may further include: receiving a modification including a new rule set associated with one or more vectors; applying the new rule set to historic data; and determining a number of times the new rule set triggered. For instance, the features may include determining the number of times the new rule set triggered determines a number of times the new rule set creates a different result. For instance, the actions may include receiving a modification including a new rule set associated with one or more vectors; passively applying the new rule set to incoming monitoring data associated; and determining a number of times the new rule set triggered. For instance, the features may include that determining the number of times the new rule set triggered determines a number of times the new rule set creates a different result.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

The laws, regulations, and procedures that define and are intended to prevent malfeasance may change. The behavior of bad actors may also change as the bad actors adjust activity to circumvent the laws, regulations, and procedures. As the size and complexity of the global economy and financial systems increases and the power of technology have increased, bad actors may employ increasingly sophisticated mechanisms to perform their bad acts, and identifying that malfeasance as suspicious activity is increasingly difficult.

A first problem is that existing systems and methods may rely solely on data describing transactions. This unidimensional approach may identify a transaction as benign, when the transaction, when put in a broader context, is highly suspicious. A second problem is that existing systems and methods do not have a dynamic schema to enable new data and/or rules to be implemented and used to identify suspicious activity. Therefore, existing systems are slow to adapt and identify new forms of suspicious activity. A third problem is that existing systems and methods for identifying suspicious activity inefficiently utilize computing resources and may be slow to generate certain outputs. A fourth problem is that existing systems may not re-evaluate past activity based on new information or rules.

Figure 1:
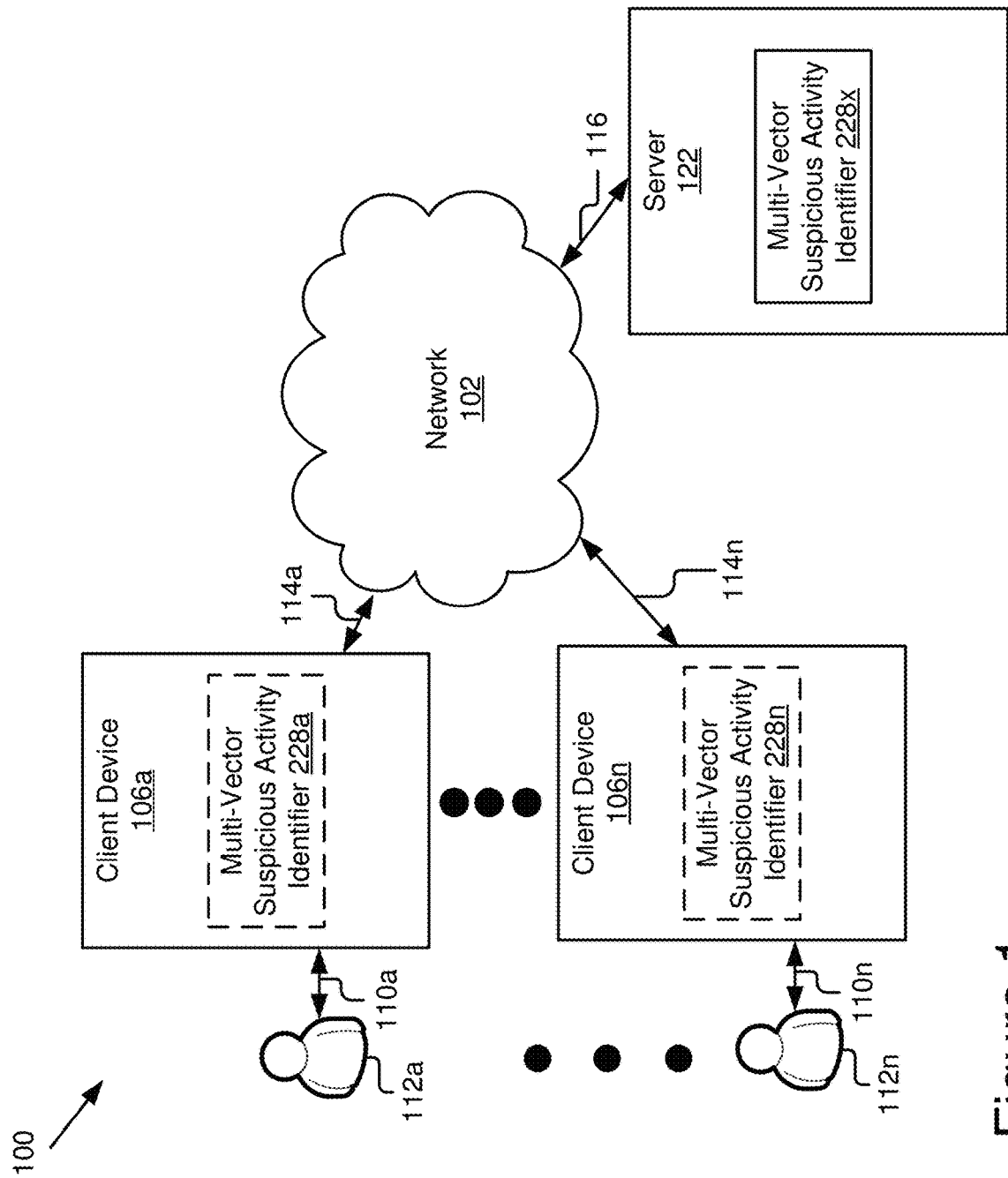
FIG. 1 illustrates a block diagram of one example system for multi-vector suspicious activity identification in accordance with some implementations.

The systems and methods described herein may address, at least in part, one or more of the foregoing problems. It should be recognized that the description, language, and examples herein are selected for clarity and convenience. Therefore, while the disclosure describes example vectors and identifying suspicious activity, the disclosure may be applied other ends and/or use other vectors Example System FIG. 1 is a block diagram of an example system 100 for multi-vector suspicious activity identification in accordance with some implementations. As depicted, the system 100 includes a server 122 and client devices 106a and 106n coupled for electronic communication via a network 102. The client devices 106a or 106n may occasionally be referred to herein individually as a client device 106 or collectively as client devices 106. Although two client devices 106 are shown in FIG. 1, it should be understood that there may be any number of client devices 106.

A client device 106 is a computing device that includes a processor, a memory, and network communication capabilities (e.g., a communication unit). The client device 106 is coupled for electronic communication to the network 102, as illustrated by signal line 114, and may be accessed by a user 112 as illustrated by line 110. In some implementations, the client device 106 may send and receive data to and from other entities of the system 100 (e.g., a server 122). Examples of client devices 106 may include, but are not limited to, mobile phones (e.g., feature phones, smart phones, etc.), tablets, laptops, desktops, netbooks, portable media players, personal digital assistants, etc.

Although two client devices 106 are shown in FIG. 1, it should be understood that there may be any number of client devices 106. It should be understood that the system 100 depicted in FIG. 1 is provided by way of example, and the system 100 and/or further systems contemplated by this present disclosure may include additional and/or fewer components, may combine components and/or divide one or more of the components into additional components, etc. For example, the system 100 may include any number of client devices 106, networks 102, or servers 122.

In some implementations, the user 112 is a human user and occasionally referred to herein as person, individual, case manager, agent, or similar.

The network 102 may be a conventional type, wired and/or wireless, and may have numerous different configurations including a star configuration, token ring configuration, or other configurations. For example, the network 102 may include one or more local area networks (LAN), wide area networks (WAN) (e.g., the Internet), personal area networks (PAN), public networks, private networks, virtual networks, virtual private networks, peer-to-peer networks, near field networks (e.g., Bluetooth®, NFC, etc.), cellular (e.g., 4G or 5G), and/or other interconnected data paths across which multiple devices may communicate.

The server 122 is a computing device that includes a hardware and/or virtual server that includes a processor, a memory, and network communication capabilities (e.g., a communication unit). The server 122 may be communicatively coupled to the network 102, as indicated by signal line 116. In some implementations, the server 122 may send and receive data to and from other entities of the system 100 (e.g., one or more client devices 106).

Other variations and/or combinations are also possible and contemplated. It should be understood that the system 100 illustrated in FIG. 1 is representative of an example system and that a variety of different system environments and configurations are contemplated and are within the scope of the present disclosure. For example, various acts and/or functionality may be moved from a server to a client, or vice versa, data may be consolidated into a single data store or further segmented into additional data stores, and some implementations may include additional or fewer computing devices, services, and/or networks, and may implement various functionality client-side or server-side. Furthermore, various entities of the system may be integrated into a single computing device or system or divided into additional computing devices or systems, etc.

For example, as depicted, the client device 106 may optionally (as indicated by the dashed lines) include an instance of the multi-vector suspicious activity identifier 228a/n and the server 122 may include an instance of the multi-vector suspicious activity identifier 228x. However, in some implementations, the components and functionality of the multi-vector suspicious activity identifier 228 may be entirely client-side (i.e., at 228a/n), entirely server side (i.e., at 228x), or divide among the client device 106 and server 122 (i.e., divided across 228a/n and 228x).

Figure 2:
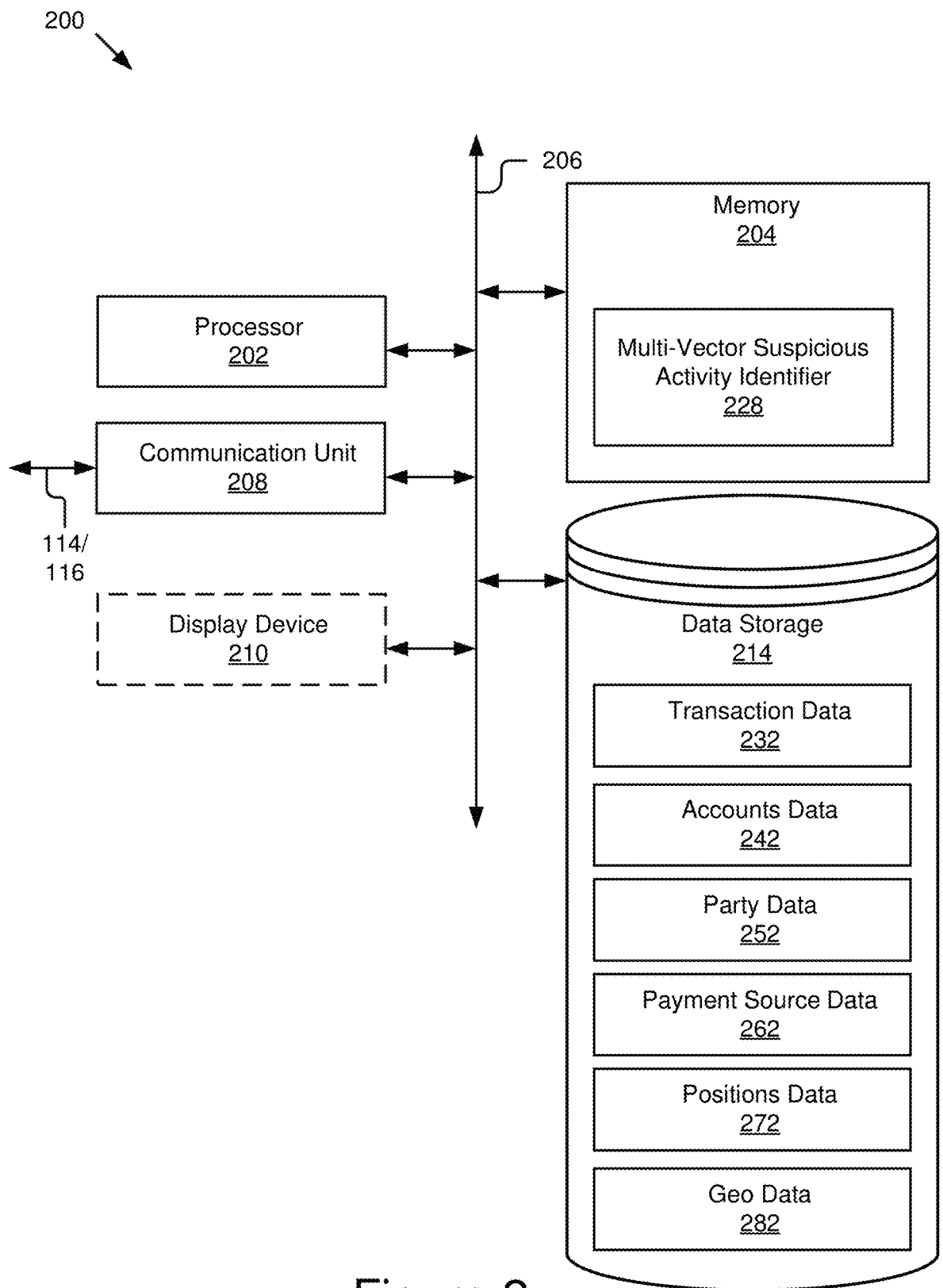
FIG. 2 illustrates a block diagram of an example computing device in accordance with some implementations.

FIG. 2 is a block diagram of an example computing device 200 including an instance of the multi-vector suspicious activity identifier 228. In the illustrated example, the example the computing device 200 includes a processor 202, a memory 204, a communication unit 208, a display device 210, and a data storage 214. In one implementation, the computing device 200 is a client device 106, the memory 204 stores the multi-vector suspicious activity identifier 228a/n, and the communication unit 208 is communicatively coupled to the network via signal line 114. In another implementation, the computing device 200 is a server 122, the memory 204 stores the multi-vector suspicious activity identifier 228x, and the communication unit 208 is communicatively coupled to the network 102 via signal line 116.

The processor 202 may execute software instructions by performing various input/output, logical, and/or mathematical operations. The processor 202 may have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual, and may include a single processing unit or a plurality of processing units and/or cores. In some implementations, the processor 202 may be capable of generating and providing electronic display signals to a display device, supporting the display of images, capturing and transmitting images, and performing complex tasks and determinations. In some implementations, the processor 202 may be coupled to the memory 204 via the bus 206 to access data and instructions therefrom and store data therein. The bus 206 may couple the processor 202 to the other components of the computing device 200 including, for example, the memory 204, the communication unit 208.

The memory 204 may store and provide access to data for the other components of the computing device 200. The memory 204 may be included in a single computing device or distributed among a plurality of computing devices. In some implementations, the memory 204 may store instructions and/or data that may be executed by the processor 202. The instructions and/or data may include code for performing the techniques described herein. For example, in one implementation, the memory 204 may store an instance of the multi-vector suspicious activity identifier 228. The memory 204 is also capable of storing other instructions and data, including, for example, an operating system, hardware drivers, other software applications, databases, etc. The memory 204 may be coupled to the bus 206 for communication with the processor 202 and the other components of the computing device 200.

The memory 204 may include one or more non-transitory computer-usable (e.g., readable, writeable) device, a static random access memory (SRAM) device, a dynamic random access memory (DRAM) device, an embedded memory device, a discrete memory device (e.g., a PROM, FPROM, ROM), a hard disk drive, an optical disk drive (CD, DVD, Blu-Ray™, etc.) mediums, which can be any tangible apparatus or device that can contain, store, communicate, or transport instructions, data, computer programs, software, code, routines, etc., for processing by or in connection with the processor 202. In some implementations, the memory 204 may include one or more of volatile memory and non-volatile memory. It should be understood that the memory 204 may be a single device or may include multiple types of devices and configurations.

The memory stores the multi-vector suspicious activity identifier 228. The multi-vector suspicious activity identifier 228 may include software and/or logic for multi-vector suspicious activity identification. The multi-vector suspicious activity identifier 228 is coupled to operate in conjunction with the processor 202 to perform multi-vector suspicious activity identification.

The communication unit 208 is hardware for receiving and transmitting data by linking the processor 202 to the network 102 and other processing systems. The communication unit 208 receives data and transmits the data via the network 102. The communication unit 208 is coupled to the bus 206. In one implementation, the communication unit 208 may include a port for direct physical connection to the network 102 or to another communication channel. For example, the computing device 200 may be the server 122, and the communication unit 208 may include an RJ45 port or similar port for wired communication with the network 102. In another implementation, the communication unit 208 may include a wireless transceiver (not shown) for exchanging data with the network 102 or any other communication channel using one or more wireless communication methods, such as IEEE 802.11, IEEE 802.16, Bluetooth® or another suitable wireless communication method.

In yet another implementation, the communication unit 208 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another implementation, the communication unit 208 may include a wired port and a wireless transceiver. The communication unit 208 also provides other connections to the network 102 for distribution of files and/or media objects using standard network protocols such as TCP/IP, HTTP, HTTPS, and SMTP as will be understood to those skilled in the art.

The display device 210 is a conventional type such as a liquid crystal display (LCD), light emitting diode (LED), touchscreen, or any other similarly equipped display device, screen, or monitor. The display device 210 represents any device equipped to display electronic images and data as described herein.

The data storage 214 is a non-transitory memory that stores data for providing the functionality described herein. The data storage 214 may include one or more non-transitory computer-readable mediums for storing the data. In some implementations, the data storage 214 may be incorporated with the memory 204 or may be distinct therefrom. The data storage 214 may be a dynamic random-access memory (DRAM) device, a static random-access memory (SRAM) device, flash memory, or some other memory devices. In some implementations, the data storage 214 may include a database management system (DBMS) operable on the computing device 200. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations. In other implementations, the data storage 214 also may include a non-volatile memory or similar permanent storage device and media including a hard disk drive, a CD-ROM device, a DVD-ROM device, a DVD-RAM device, a DVD-RW device, a flash memory device, or some other mass storage device for storing information on a more permanent basis. The data storage 214 is communicatively coupled to the bus 206.

The data storage 214 may store, among other data, transaction data 232, accounts data 242, party data 252, payment source data 262, positions data 272, and geo data 282.

It should be apparent to one skilled in the art that other processors, operating systems, inputs (e.g., keyboard, mouse, one or more sensors, microphone, etc.), outputs (e.g., a speaker, display, haptic motor, etc.), and physical configurations are possible and within the scope of the disclosure.

Figure 3:
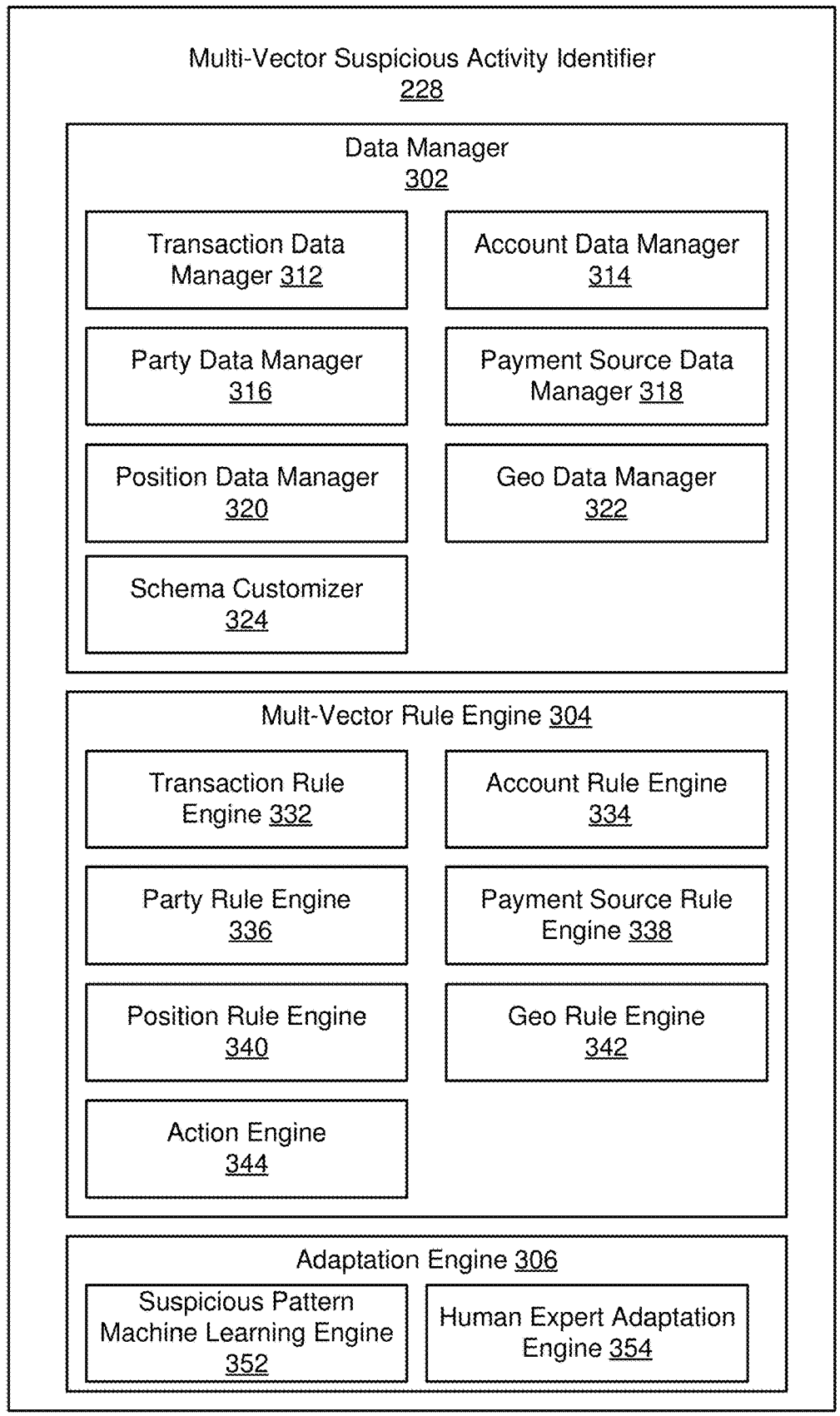
FIG. 3 illustrates a block diagram of an example multi-vector suspicious activity identifier in accordance with some implementations.

Referring now to FIG. 3, a block diagram of an example multi-vector suspicious activity identifier 228 is illustrated in accordance with one implementation. As illustrated in FIG. 3, the multi-vector suspicious activity identifier 228 may include a data manager 302, a multi-vector rule engine 304, and an adaptation engine 306.

The data manager 302 may include software and/or logic for receiving monitoring data, generating one or more vector-specific monitoring features, and applying one or more vector-specific schemas.

The data manager 302 receives monitoring data, which may also be referred to herein a "raw data." In some implementations, the data manager 302 receives monitoring data from one or more third party systems (not shown). Examples of third-party systems may include, but are not limited systems associated with banks, credit unions, brokerages, and other entities. The data manager 302 is communicatively coupled to obtain the monitoring data. For example, the data manager 302 may be communicatively coupled to one or more of the memory 204, the data storage 214, and one or more third-party systems (not shown) via the network 102 to retrieve the monitoring data.

In some implementations, data manager 302 receives monitoring data in a batch. For example, in some implementations, the data manager 302 obtains all of Bank A's transaction data for the previous 24 hours from Bank A at 5 pm. In some implementations, data manager 302 receives monitoring data in real-time. For example, in some implementations, the data manager 302 obtains data describing transactions from Bank A or data describing an account opening at Bank A, via an API, when the transaction occurs or when the new account is opened.

A vector generally has a direction and magnitude. In the example use cases described herein the direction may point toward activity being suspicious activity, away from the activity being suspicious, or be neutral. In some implementations, a vector is associated with a set of data and a set of one or more rules that may be applied to the set of data.

A vector may be better understood by reference to an example. Existing systems examine only the transaction vector, i.e., existing systems use only data describing the transaction and one or more rules applied to the transaction or data describing the transaction to determine whether suspicious activity is present. However, such an approach is limited in the type of suspicious activity it may detect.

For example, consider a transaction in which a phone bill is paid. This transaction in isolation may not seem suspicious based on the transaction vector. However, if account data 242, associated with an account vector, is examined and identifies the phone bill account holder's name, and payment source data 262, associated with a payment source vector, is examined and identifies the card holder's name, and then the account data 242 is examined to identify other card holders on the credit card account, and a determination is made that there is no match (e.g., no common name or surname), the account vector and payment source vectors begin to point toward that payment as being suspicious activity (e.g., done using a stolen credit card).

As another example, a transfer of money to a new recipient (i.e., a transaction) may not be uncommon or suspicious. However, if the password on the sending account was changed multiple times recently (i.e., account vector), the email contact information for the account was changed recently after a password change (i.e., account vector), and the transaction sends money to an institution in a location (i.e., location vector) from which the transaction was initiated and which is known to be a source of fraud, cybercrime, etc., but to which the account has no affiliation based on the account data (i.e., account vector) or a transaction history (i.e., transaction vector), that transaction when viewed in the broader context using the combination of the transaction, account, and location vectors may be considered suspicious activity.

For clarity and convenience, the disclosure herein describes, but is not limited to, example vectors including one or more of transaction, account, party, payment source, position, and geo. However, it should be recognized that these are merely illustrative examples provided for understanding and that other vectors exist and may be applied without departing from the description herein.

In some implementations, the data manager 302 supplements the monitoring data with one or more monitoring features. Monitoring features are not included in the monitoring data but generated and maintained by the data manager 302 or one of its subcomponents 312-324. In some implementations, a monitoring feature may be based on monitoring data.

The monitoring features may vary based on the vector, and there are so numerous as to defy a complete list. However, some non-limiting examples of monitoring features for various vectors are described, below, with reference to the transaction data manager 312, the account data manager 314, party data manager 316, the payment source data manager 318, the position data manager 320, and a geo data manager.

The data manager 302 applies a schema. Depending on the implementation, sources of monitoring data may, or may not, provide monitoring data in a common format. In some implementations, the applies a common schema to monitoring data so that one or more rules may be applied, uniformly by the multi-vector rule engine 304 or its subcomponents 332-344, without regard to the original source of the monitoring data or its default format.

In some implementations, the data manager 302 applies one or more vector-specific schemas. A vector-specific schema structures monitoring data and monitoring features associated with a particular vector. Examples of vector-specific schemas are described further below, with reference to the transaction data manager 312, the account data manager 314, party data manager 316, the payment source data manager 318, the position data manager 320, and a geo data manager 322. A combination of monitoring data and monitoring feature data with the applied vector-specific schema, may be referred to herein as schema-specific data. Therefore, the transaction data 232, accounts data 243, the party data 252, payment source data 262, positions data, and geo data 282 represent instances of vector-specific data.

The multi-vector rule engine 304 may include software and/or logic for applying one or more rules across, or associated with, one or more vectors and performing one or more actions based on the one or more rules. In some implementations, the multi-vector rule engine 304 applies one or more vector-specific rules. In some implementations, a vector-specific rule applies a rule to data associated with the same vector. For example, in one implementation, a transaction rule is applied to transaction data 232, an account rule is applied to account data 242, a party rule is applied to party data 252, and so forth.

The one or more rules may vary based on the vector and the vector-specific rule engine 332/334/336/338/340/342, and the rules and combinations of rules across one or more vectors are so numerous as to defy a complete list. However, some non-limiting examples of vector specific rules are described, below, with reference to the transaction rule engine 332, the account rule engine 3334, the party rule engine 336, the payment source rule engine 338, the position rule engine 340, and a geo rule engine 342.

The multi-vector rule engine 304, and its subcomponents 332-344, are communicatively coupled to obtain schema specific data 232/242/252/262/272/282 and to apply one or more rules. For example, the multi-vector rule engine 304, or one or more of its subcomponents 332-344, may be communicatively coupled to one or more of the memory 204 and the data storage 214 to retrieve one or more instances of schema specific data 232-282. As another example, the multi-vector rule engine 304, or one or more of its subcomponents 332-344, may be communicatively coupled to the data manager 302, or one or more of its subcomponents 312-324, to retrieve one or more instances of schema specific data 232-282.

The adaptation engine 306 may include software and/or logic for one or more of creating, removing, or modify one or more of a schema, a rule, and an action. Depending on the implementation, the modification may be machine learning based, as described with reference to the suspicious pattern machine learning engine 352, or the modification may be generated explicitly based on human user input, as described below with reference to the human expert adaptation engine 354.

The adaptation engine 306, and its subcomponents 352-354, are communicatively coupled to one or more of the data manager 302, or its subcomponents 312-324, to modify a schema. For example, the adaptation engine 306, and its subcomponents 352-354, are communicatively coupled to the schema customizer 324 to create new vector specific data (not shown) or modify the schema applied by one or more of the vector-specific data managers 312-322.

The adaptation engine 306, and its subcomponents 352-354, are communicatively coupled to one or more of the multi-vector rule engine 304, or its subcomponents 332-344, to modify one or more of a rule and an action. For example, the adaptation engine 306, and its subcomponents 352-354, are communicatively coupled to the vector-specific rule engines 332-342 to create, modify, or delete a rule applied by one or more of the vector-specific rule engines 332-342.

The adaptation engine 306, and its subcomponents 352-354, are communicatively coupled to action engine 344 to modify one or more of a rule and an action. For example, the adaptation engine 306, and its subcomponents 352-354, are communicatively coupled to the action engine 344 to create, modify, or delete an action triggered by a rule.

In some implementations, as illustrated in FIG. 3, the data manager 302 may comprise a transaction data manager 312, an account data manager 314, a party data manager 316, a payment source data manager 318, a position data manager 320, a geo data manager 322, and a schema customizer 324.

The transaction data manager 312 may include software and/or logic for receiving transaction monitoring data, generating one or more transaction monitoring features, and applying a transaction-specific schema to the transaction data 232.

Transaction monitoring data describes one or more transaction. The transaction monitoring data may vary based on the implementation and use case. Examples of transaction monitoring data may include, but are not limited to, one or more of a transaction data, a transaction time, a transaction amount, a transaction source identifier, and a transaction destination identifier. The transaction source and/or the transaction destination may include different information depending on one or more of a monitoring data source, an implementation, and a use case. Examples of a transaction source identifiers and transaction destination information may include, but are not limited to, a routing number, an account number, etc.

In some implementations, the transaction monitoring features are generated based on the transaction monitoring data. The transaction monitoring features may vary based on one or more of a transaction type, a use case, and an implementation. Examples of transaction monitoring features may include, but are not limited to, a transaction velocity, a transaction impact and a transaction likelihood, a total risk score (e.g., a function of impact, likelihood, and velocity) associated with a transaction, a number of name changes for a party to the transaction in the last 30 days, a number of parties a party (e.g., payor) to the transaction has transacted with using that payment source method in the last day, the country ISO codes of the parties to the transaction, a geo code or latitude and longitude associated with the transaction, a minimum amount of that transaction type for a party to the transaction in the last day, a total amount of transactions associated with an account in the last 7 days, payment source creator (e.g. Visa or Credit Union, etc.).

In some implementations, the transaction monitoring feature(s) include a statistical measure associated with transaction. Examples of statistical measures may include a total, an average, a median, quartiles, etc. For example, an average, or median, transaction amount, an average, or median, transaction velocity, an average, or median, transaction impact, an average, or median, transaction likelihood, and an average, or median, total risk score. Some of the statistical measures may be transaction specific, while others may be calculated across one or more transactions (e.g., average transaction from that source to that destination) depending on the implementation.

In some implementations, the transaction monitoring feature(s) include a rolling statistical measure. For example, any of the aforementioned statistical measures over one or more rolling periods of time. For example, referring to an average velocity, the rolling period may include one or more of an average velocity over the last 24 hours, 3 days, week, 30 days, 3 months/quarter, year, 3 years, 5 years, etc.

In some implementations, one or more of the transaction monitoring features are updated as new transaction monitoring data is received from one or more sources, which may be referred to as preprocessing the data. It should be recognized that, the preprocessing of the data to generate transaction monitoring features, may beneficially provide more rapid rule execution and suspicious activity identification, which may allow suspicious activity to be identified more quickly and make it more likely the suspicious activity may be stopped.

The account data manager 314 may include software and/or logic for receiving account monitoring data, generating one or more account monitoring features, and applying an account-specific schema to the account data 242.

Account monitoring data describes one or more accounts and/or interactions with an account. The account monitoring data may vary based on the implementation and use case. Examples of account monitoring data may include, but are not limited to, one or more of an account number, an account balance, account owner(s), physical address of account owner, account owner contact information, authorized users of the account, etc. Examples of actions may include, but are not limited to opening an account, closing an account, logging into or out of an account, changing an account holder, beneficiary, or authorized user, changing contact information associated with an account, changing password used to access account, etc.

In some implementations, the account monitoring features are generated based on the account monitoring data. The account monitoring features may vary based on one or more of an account type, a use case, and an implementation. Examples of account monitoring features may include, but are not limited to, an account velocity, an account impact, and an account likelihood, a total risk score (e.g., a function of impact, likelihood, and velocity) associated with the account.

In some implementations, the account monitoring feature(s) include a statistical measure associated with an account. Examples of statistical measures may include a total, an average, a median, quartiles, etc. For example, an average, or median, balance, withdrawal, deposit, number of transactions, times the contact information is changed, etc. Some of the statistical measures may be account specific (e.g., average balance for that account), while others may be calculated across one or more accounts (e.g., average checking account balance at that credit union) depending on the implementation.

In some implementations, the account monitoring feature(s) include a rolling statistical measure. For example, any of the aforementioned statistical measures over one or more rolling periods of time. For example, referring to an average balance, the rolling period may include one or more of an average balance over the last 24 hours, 3 days, week, 30 days, 3 months/quarter, year, 3 years, 5 years, etc.

In some implementations, one or more of the account monitoring features are updated as new account monitoring data is received from one or more sources, which may be referred to as preprocessing the data. It should be recognized that, the preprocessing of the data to generate account monitoring features, may beneficially provide more rapid rule execution and suspicious activity identification, which may allow suspicious activity to be identified more quickly and make it more likely the suspicious activity may be stopped.

The party data manager 316 may include software and/or logic for receiving party monitoring data, generating one or more party monitoring features, and applying a party-specific schema to the party data 252.

Party monitoring data describes a party. The party monitoring data may vary based on the implementation and use case. Examples of party monitoring data may include, but are not limited to, one or more of a name (e.g., a first, middle, and last), a date of birth, a data of death, an age, an identifier (e.g., Social Security Number, driver's license number, passport number, tac ID number), contact information, income, residence, contact information, membership on a watchlist (e.g., terrorist watch list or most wanted), etc.

In some implementations, the party monitoring features are generated based on the party monitoring data. The party monitoring features may vary based on one or more of a party type (e.g., individual or business), a use case, and an implementation. Examples of party monitoring features may include, but are not limited to, a party account velocity, a party impact, and a party likelihood, a total risk score (e.g., a function of impact, likelihood, and velocity) associated with the party, a number of transactions associated with a party in the last 30 days, a processing host name, a number of merchant name changes in the last 7 days.

In some implementations, the party monitoring feature(s) include a statistical measure associated with a party. Examples of statistical measures may include a total, an average, a median, quartiles, etc. For example, an average number of transactions associated with the party in a specified period.

In some implementations, the party monitoring feature(s) include a rolling statistical measure. For example, any of the aforementioned statistical measures over one or more rolling periods of time. For example, referring to total number of transactions or name changes associated with the client, the period may include a total over one or more of the last 24 hours, 3 days, week, 30 days, 3 months/quarter, year, 3 years, 5 years, etc.

In some implementations, one or more of the party monitoring features are updated as new party monitoring data is received from one or more sources, which may be referred to as preprocessing the data. It should be recognized that, the preprocessing of the data to generate party monitoring features, may beneficially provide more rapid rule execution and suspicious activity identification, which may allow suspicious activity to be identified more quickly and make it more likely the suspicious activity may be stopped.

The payment source data manager 318 may include software and/or logic for receiving payment source monitoring data, generating one or more payment source monitoring features, and applying a payment source-specific schema to the payment source data 262.

Payment source monitoring data describes a payment source. The payment source monitoring data may vary based on the implementation and use case. Examples of payment source monitoring data may include, but are not limited to, one or more of a card number, a cardholder, a credit limit, a credit balance, authorized user(s), issuer, etc.

In some implementations, the payment source monitoring features are generated based on the payment source monitoring data. The payment source monitoring features may vary based on one or more of a payment source type (e.g., credit card, checking account, brokerage account, etc.), a use case, and an implementation. Examples of payment source monitoring features may include, but are not limited to, a payment source velocity, a payment source impact and a payment source likelihood, a total risk score (e.g., a function of impact, likelihood, and velocity) associated with a payment source.

In some implementations, the payment source monitoring feature(s) include a statistical measure associated with payment source. Examples of statistical measures may include a total, an average, a median, quartiles, etc. For example, an average, or median, transaction amount for the payment source, an average, or median, credit balance, an average, or median, monthly charges, etc. Some of the statistical measures may be payment source specific (e.g., the average balance carried on a particular credit card), while others may be calculated across one or more payment sources (e.g., average credit card debit across all the person's cards, or average credit balance for people with a similar demographic to the card holder) depending on the implementation.

In some implementations, the payment source monitoring feature(s) include a rolling statistical measure. For example, any of the aforementioned statistical measures over one or more rolling periods of time. For example, referring to an average spend, the rolling period may include one or more of an average spend over the last 24 hours, 3 days, week, 30 days, 3 months/quarter, year, 3 years, 5 years, etc.

In some implementations, one or more of the payment source monitoring features are updated as new payment source monitoring data is received from one or more sources, which may be referred to as preprocessing the data. It should be recognized that, the preprocessing of the data to generate payment source monitoring features, may beneficially provide more rapid rule execution and suspicious activity identification, which may allow suspicious activity to be identified more quickly and make it more likely the suspicious activity may be stopped.

The position data manager 320 may include software and/or logic for receiving positions monitoring data, generating one or more positions monitoring features, and applying a positions-specific schema to the positions data 272.

Position monitoring data describes a position. The position data may vary based on the implementation and use case. Examples of positions may include but are not limited to investment positions (e.g., an option, a put, a call, a short, a purchase, a sale, etc.), inventory positions (item inventory), insurance positions, etc. Examples of position monitoring data may include, but are not limited to, a dollar value or share quantity associated with an option, a put, a call, a short, a purchase, a sale, etc. of a stock or other financial instrument, a ticker symbol associated with the financial instrument, a cost basis, a capital gain type, percentage of gain or loss in value since purchase; item inventory; description of insured object or entity, insurance policy limits, insurance policy deductibles, amount insured, policy number, premium, deductible, beneficiary, etc.

In some implementations, the position monitoring features are generated based on the position monitoring data. The position monitoring features may vary based on one or more of a position type, a use case, and an implementation. Examples of position monitoring features may include, but are not limited to, a capital gain type, percentage of gain or loss in value since purchase, etc.

In some implementations, the position monitoring feature(s) include a statistical measure associated with transaction. Examples of statistical measures may include a total, an average, a median, quartiles, etc. For example, an average, or median, position amount, an average, or median, position velocity, an average, or median, position impact, an average, or median, position likelihood, and an average, or median, total risk score. Some of the statistical measures may be position specific (e.g., average realized capital gains), while others may be calculated across one or more accounts (e.g., average 30-year term life insurance policy payout value) depending on the implementation.

In some implementations, the position monitoring feature(s) include a rolling statistical measure. For example, any of the aforementioned statistical measures over one or more rolling periods of time. For example, referring to an average dollar value of investment instruments sold, the rolling period may include one or more of an average dollar value of investment instruments sold over one or more of the last 24 hours, 3 days, week, 30 days, 3 months/quarter, year, 3 years, 5 years, etc.

In some implementations, one or more of the position monitoring features are updated as new position monitoring data is received from one or more sources, which may be referred to as preprocessing the data. It should be recognized that, the preprocessing of the data to generate position monitoring features, may beneficially provide more rapid rule execution and suspicious activity identification, which may allow suspicious activity to be identified more quickly and make it more likely the suspicious activity may be stopped.

The geo data manager 322 may include software and/or logic for receiving geo monitoring data, generating one or more geo monitoring features, and applying a geo-specific schema to the payment source data 262.

The geo monitoring data describes a location. The location monitoring data may vary based on the implementation and use case. Examples of geo monitoring data may include, but are not limited to, one or more of a physical location and a digital location. Examples of a physical location may include, but are not limited to, a latitude and longitude and a street address. Examples of a digital location may include one or more of an IP address, MAC address, internet service provider location, VPN or proxy address, electronic serial number, etc.

In some implementations, the geo monitoring features are generated based on the geo monitoring data. The geo monitoring features may vary based on one or more of a transaction type, a use case, and an implementation. Examples of geo monitoring features may include, but are not limited to, an average or mode location for a party in association with a transaction or type of transaction, whether an advertised location matches an actual location (e.g., after piercing proxies), whether a location has been flagged (e.g., as a scammer's server farm) etc.

In some implementations, the geo monitoring feature(s) include a statistical measure associated with the location. Examples of statistical measures may include a total, an average, a median, quartiles, mode, etc. For example, range of a party's location over the last day, e.g., to determine whether a current location is an outlier.

In some implementations, the geo monitoring feature(s) include a rolling statistical measure. For example, any of the aforementioned statistical measures over one or more rolling periods of time. For example, referring to an average location, the rolling period may include one or more of an average location over the last 24 hours, 3 days, week, 30 days, 3 months/quarter, year, 3 years, 5 years, etc.

In some implementations, one or more of the geo monitoring features are updated as new geo monitoring data is received from one or more sources, which may be referred to as preprocessing the data. It should be recognized that, the preprocessing of the data to generate geo monitoring features, may beneficially provide more rapid rule execution and suspicious activity identification, which may allow suspicious activity to be identified more quickly and make it more likely the suspicious activity may be stopped.

The schema customizer 324 may include software and/or logic for customizing the vector-specific data 232/242/252/262/272/282. For example, the schema customizer 324 may change the schema type (e.g., flattened or normalize, relational or nor-relational), modify features, e.g., to add, change, or remove monitoring data fields or monitoring feature fields. As another example, the schema customizer may add or remove vector-specific data types. For example, in some implementations, the schema customizer 324 may create beneficiary data (not shown) as a new vector-specific data type. As another example, in some implementations, the schema customizer 324 may remove the geo data 282. In some implementations, the schema customizer 324, may remove the geo data 282 as separate vector-specific data, but modify one or more of the other vector-specific data types to apply geo data (e.g., to apply location data to transaction in the transaction data 232, to parties in the party data 252, etc.).

In some implementations, the vector-specific data 232/242/252/262/272/282 are not mutually exclusive and may share one or more common elements. Examples of common elements include types of monitoring data and monitoring features. For example, transaction data 232 and accounts data 242 may both include an account number as monitoring data. As another example, transaction data 232 and accounts data 242 may both include a total amount of transactions over the last 7 days as a feature.

In some implementations, the schema customizer 324 may include software and/or logic for customizing the vector-specific data 232/242/252/262/272/282 based on instructions received from the adaptation engine 306, or a subcomponent 352-354 thereof.

In some implementations, as illustrated in FIG. 3, the multi-vector rule engine 304 may comprise a transaction rule engine 332, an account rule engine 334, a party rule engine 336, a payment source rule engine 338, position rule engine 340, a geo rule engine 342, and an action engine 344.

The transaction rule engine 332 may include software and/or logic for applying one or more transaction rules. In some implementations, a transaction rule may be applied to the transaction data 232. For example, in some implementations, a transaction rule includes a condition that if met, based on the transaction data 232, triggers the action engine 344 to take a specified action(s).

Examples of transaction rules are so numerous as to defy a complete list; however, below are some non-limiting examples. For example, transaction destination new to source, large transaction amount, transaction frequency satisfies a threshold, transaction within a determined threshold beneath a reporting limit, total amount of transaction for a party in the last 7 days exceeds a first threshold and the number of transactions exceeds a second threshold, etc.

The account rule engine 334 may include software and/or logic for applying one or more account rules. In some implementations, an account rule may be applied to the account data 242. For example, in some implementations, an account rule includes a condition that if met, based on account data 242, triggers the action engine 344 to take specified action(s).

Examples of account rules are so numerous as to defy a complete list; however, below are some non-limiting examples. For example, account contact information changed, new contact info after password reset, failed login attempts exceed a threshold, withdrawal "large" for the account, net cash outflow is anomalous (e.g., above X percentile), new account opened with different contact information for account holder, etc.

The party rule engine 336 may include software and/or logic for applying one or more party rules. In some implementations, a party rule may be applied to the party data 252. For example, in some implementations, a party rule includes a condition that if met, based on account data 242, triggers the action engine 344 to take specified action(s).

Examples of party rules are so numerous as to defy a complete list; however, below are some non-limiting examples. For example, party is a minor, party exceeds an age (e.g., age of majority, pension age, etc.) party is deceased, party is present on watch list, party is subject of negative news, party changed name, party changed ownership (e.g., where party is a business), party is dissolved, party is not a domestic party, party resides in a country associated with an embargo or other international restriction, etc.

The payment source rule engine 338 may include software and/or logic for applying one or more payment source rules. In some implementations, a payment source rule may be applied to the payment source data 262. For example, in some implementations, a payment source rule includes a condition that if met, based on payment source data 262, triggers the action engine 344 to take specified action(s).

Examples of payment source rules are so numerous as to defy a complete list; however, below are some non-limiting examples. For example, payment source name corresponds to name associated with a destination account, transaction exceeds payment source limit, etc.

The position rule engine 340 may include software and/or logic for applying one or more position rules. In some implementations, a position rule may be applied to the position data 272. For example, in some implementations, a position rule includes a condition that if met, based on position data 272, triggers the action engine 344 to take specified action(s).

Examples of position rules are so numerous as to defy a complete list; however, below are some non-limiting examples. For example, high proportion of account value in a single position, number of shorts or dollar value exceed a threshold, shorts in an industry or company satisfy a threshold, insurance policy value exceeds a threshold, policy start date and date of loss within a predefined period of time, etc.

The geo rule engine 342 may include software and/or logic for applying a geo rule. A geo rule is a rule based on location. Depending on the implementation, the location may be physical or digital. Examples of a physical location may include, but are not limited to, a latitude and longitude and a street address. Examples of a digital location may include one or more of an IP address, MAC address, internet service provider location, VPN or proxy address, electronic serial number, etc.

Examples of geo rules are so numerous as to defy a complete list; however, below are on-limiting examples. In some implementations, the geo rule engine 342 applies a rule to determine whether a location (e.g., a location associated with the receiving account in a transaction) is associated with a high-risk country (i.e., a country from which fraudulent activity is common). In some implementations, the geo rule engine 342 applies a rule to determine a consistency between an advertised location and an actual location. For example, the applies a rule to pierce any VPNs or proxies and determine your actual IP address and compares that prior IP addresses or if the host or ISP is located in the same geographic area as the address on-file for the account.

The action engine 344 may include software and/or logic for performing one or more actions triggered by a rule. Therefore, in some implementations, a particular rule may be associated with multiple actions (i.e., one-to-many) or a single action (i.e., one-to-one).

Examples of actions include, but are not limited to, triggering one or more other rules, generating a suspicious activity alert, opening a case to investigate suspicious activity (e.g. as money laundering, terrorist financing, structuring, RICO violation, etc.), stopping the activity (e.g., preventing one or more of the transaction, the account opening, change of beneficiary or contact information, short sale, etc.), calling a party (e.g., the card or account holder) or the authorities (e.g., local police, FBI, IRS, SEC, Homeland Security, Interpol, etc.), suspending an account, freezing a method of payment, sending an electronic communication (e.g., prompting a clerk confiscate the credit card through a point of sale device or prompting the card holder to authorize the transaction via a text message or push notification), etc.

In some implementations, the action engine 344 triggers one or more rules. In some implementations, the one or more rules triggered may be, but are not necessarily, in the same vector as the rule that triggered the action. For example, in some implementations, an account rule (i.e., account vector) may trigger, or cause the action engine 344 to trigger, a party rule (i.e., party vector).

In some implementations, a rule is analogous to or uses an "IF" statement, and the triggered action is analogous to a "THEN" or "ELSE" statement. For example, if the transaction rule determines a first transaction rule is affirmative, then the action engine 344 may trigger application of an account rule, stop the transaction, or both. In some implementations, a rule in one vector may use supplemental data from another vector. In some implementations, the one or more of the rule engines 332-342 may query one or more of the data managers 312-322. For example, in some implementations, a transaction rule may execute to determine whether a transaction in the transaction data 232 is an international transaction, and the transaction rule engine 322 queries the account data manager 314 and/or the geo data manager 322 to determine whether both the source and destination are domestic. If not, the action engine 344 may trigger a different set of one or more rules and if both parties are domestic.

In some implementations, the action engine 344 receives a triggered action identifier. For example, the action engine 344 receives a rule identifier, and triggers the rule associated with the received action identifier. In some implementations, the action engine 344 may receive other information associated with an action (e.g., information that may be used as an input by a subsequent action. For example, in some implementations, the action engine 344 may receive a "transact_rule37; senior_acct_holder-true," and the action engine 344 triggers transaction rule 37, and tell the rule to execute based on the account holder being 65 or older.

The action engine 344 is communicatively coupled to one or more of the vector-specific rule engines 332-342. For example, the action engine 344 may be communicatively coupled to one or more of the memory 204 and the data storage 214 to retrieve a triggered action. As another example, the action engine 344 may be communicatively coupled to the vector-specific rule engines 332-342 to receive the one or more triggered actions.

The action engine 344 is communicatively coupled to one or more of the vector-specific rule engines 332-342 and the network 102. For example, the action engine 344 may be communicatively coupled to one or more of the vector-specific rule engines 332-342 to trigger a rule associated therewith. As another example, the action engine 344 may be communicatively coupled to the network 102 to accomplish a task using various systems (not shown). For example, to send a hold to a bank (not shown) to stop a transaction, to place a phone call, send a text message, etc.

In some implementations, as illustrated in FIG. 3, the adaptation engine 306 may comprise a suspicious pattern machine learning engine 352 and a human expert adaptation engine 354.

The suspicious pattern machine learning engine 352 may include software and/or logic for applying machine learning to identify a pattern associated with suspicious activity. The patterns identified are so numerous as to defy a complete list, but some non-limiting examples are described below.

The varieties of supervised, semi-supervised, and unsupervised machine learning algorithms that may be used, by the suspicious pattern machine learning engine 352, to train a machine learning model are so numerous as to defy a complete list. Example algorithms include, but are not limited to, a decision tree; a gradient boosted tree; boosted stumps; a random forest; a support vector machine; a neural network; a recurrent neural network; long short-term memory; transformer; logistic regression (with regularization), linear regression (with regularization); stacking; a Markov model; Markov chain; support vector machines; and others. Additionally, depending on the implementation, the various machine learning models trained and deployed, by the suspicious pattern machine learning engine 352, may or may not be based on a common algorithm or a common type of machine learning algorithm. For example, a first type of machine learning algorithm may be trained and deployed to identify a wash cycle, and a second type of machine learning algorithm may be trained and deployed to identify unused labels or new rules.

In some implementations, the pattern, when identified, indicates the presence of suspicious activity. For example, in some implementations, the suspicious pattern machine learning engine 353 generates a linkage model by traversing X number of vectors, where a vector is associated with a data set 232/242/252/262/272/282, and N layers deep.

For example, in one implementation, the suspicious pattern machine learning engine 353 traverses the transaction, account, and persons vectors (i.e., X=3) two layers (i.e., N=2) deep and generates a linkage model, such as a graph database. For example, for an initial transaction, the suspicious pattern machine learning engine 353, at layer N=1, identifies the parties to that transaction (i.e., initial parties) and the accounts associated with that transaction (i.e., the initial accounts). The suspicious pattern machine learning engine 353, at layer N=2, may then identifies secondary transactions (i.e., other transactions associated with the initial accounts and other transaction associated with the initial parties), secondary parties (i.e., parties associated with initial accounts), and secondary accounts (i.e., other accounts associated with the initial parties). The foregoing may be repeated for other initial transactions. In implementations where N is greater than two, the suspicious pattern machine learning engine 353 may continue to identify tertiary transactions, accounts, and parties and so on. However, for simplicity, the described example stops at two layers.

In some implementations, the linkage model is a graph database. For example, the suspicious pattern machine learning engine 353 generates a network graph of the initial and identifies any patterns. For example, in some implementations, the suspicious pattern machine learning engine 353 using the linkage model may detect a "wash cycle," whereby a series of transactions go through a common set of accounts associated with a common set of parties and back to the original account and/or party. It should be noted that wash cycles with multiple intermediaries (people, accounts, payment methods) quickly become very difficult to detect using existing methods; however, using the data sets 232/242/252/262/272/282 methods described herein, the suspicious pattern machine learning engine 353 may identify and label complex wash cycles and/or generate one or more rules that, when applied by the Multi-vector rule engine 304, or one or more of its subcomponents 332-344, may identify and such wash cycles, which may also be referred to as "circular payments."

Figure 9:
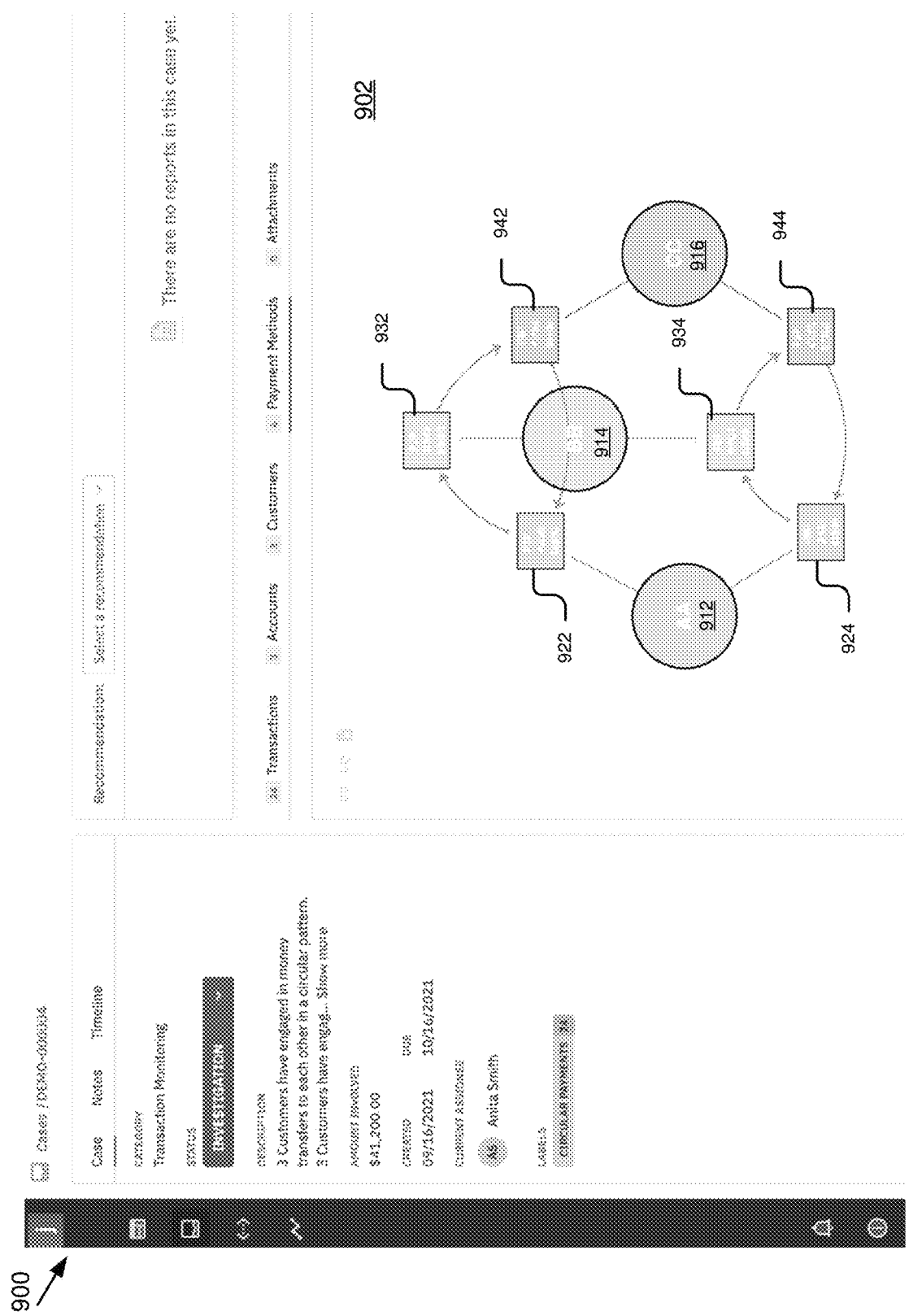
FIG. 9 illustrates a user interface including an example of a three person wash cycle in accordance with some implementations.

For example, referring now to FIG. 9, user interface 900 illustrating an example of a three person wash cycle in portion 902. In the linkage model illustrated in pane 902, the parties are illustrated by circle, i.e., party AA by circle 912, party BB by circle 914, and party CC by circle 916. In the illustrated example, each party is associated with two transactions, and each transaction is represented by a box with includes the type of transaction, an account or payment method, and an amount.

AA is associated with two person-to-person (P2P) transactions 922 and 924, as indicated by the lines connecting circle 912 to the boxes 922 and 924 and "P2P" appearing in boxes 922 and 924. Transaction 922 is associated with an account or payment method AA02 and in the amount of $6500. Transaction 924 is associated with an account or payment method AA01 and in the amount of $7300.

BB is associated with two person-to-person (P2P) transactions 932 and 934, as indicated by the lines connecting circle 914 to the boxes 932 and 934. Transaction 932 is associated with an account or payment method BB04 and in the amount of $6500. Transaction 934 is associated with an account or payment method BB03 and in the amount of $7300.

CC is associated with two person-to-person (P2P) transactions 942 and 944, as indicated by the lines connecting circle 916 to the boxes 942 and 944. Transaction 942 is associated with an account or payment method CC06 and in the amount of $6400. Transaction 944 is associated with an account or payment method CC05 and in the amount of $7200.

As illustrated by the arrows circulating clockwise from 922 to 932 to 942 and back to 922, a circular payment is present. Also as illustrated by the arrows circulating clockwise from 924 to 934 to 944 and back to 924, a second circular payment is present. These circular payments may be indicative of money laundering. In some implementations, the directionality of the arrows may be determined by relative timing of the transactions 922, 932, and 942, or 924, 934, and 944, to one another.

In some implementations, the suspicious pattern machine learning engine 353 identifies a pattern associated with suspicious activity indicative of a false positive or true negative. For example, in some implementations, the suspicious pattern machine learning engine 353 may determine that cases to investigate a type of suspicious activity are being immediately closed, which may be indicative of the cases being false positives, and automatically adjusts one or more rules to reduce the rate of false positives. In another example, suspicious pattern machine learning engine 353 may determine that cases to investigate a type of suspicious activity often are modified (e.g., labeled) by a human case manager to include a second type of suspicious activity, which may indicate a false negative on the second activity, and adjusts one or more of the rules, so that future instances of the second activity are identified. In some implementations, the suspicious pattern machine learning engine 353 trains a machine learning algorithm to determine the one or more rules to create, remove, or modify to reduce false-positives and/or reduce false negatives.

In some implementations, the suspicious pattern machine learning engine 353 may identify information not used by a rule where that information may be highly predictive of suspicious activity and create a new rule or modify an existing rule to use that information. For example, in some implementations, the suspicious pattern machine learning engine 353 may monitor negative news and determine that there is a correlation between homicide convictions and large life insurance policies (i.e., a position) opened prior to a person being reported missing, where the party convicted of the homicide was the life insurance beneficiary. In some implementations, the suspicious pattern machine learning engine 353 may write party rule that if the party is declared missing or dead, trigger a position rule to determine whether a life insurance policy exists insuring the missing or dead individual; if there is such a policy, trigger a second position rule to determine whether the policy predates the missing/death date by a threshold period; if not, trigger a party rule to identify the beneficiaries and open a case of suspected insurance fraud, i.e., suspicious activity, involving the beneficiaries.

In some implementations, the suspicious pattern machine learning engine 353 may modify a schema, e.g., of one or more of the accounts data 242, the party data 252, and positions data 272, to include beneficiary information if not already present. For example, the suspicious pattern machine learning engine 353 is communicatively coupled to the schema customizer 324 to make the modification to the schema.

The human expert adaptation engine 354 may include software and/or logic for applying human input to create, delete, or modify one or more of a schema, a rule, and an action. For example, in some implementations, the human expert adaptation engine 354 provides a rule tuning user interface (not shown) to a user, and the user may interact with the rule tuning user to modify one or more of a schema, a rule, and an action. For example, consider a scenario in which a fraud scheme run out of the Dominican Republic is targeting the elderly in order to clear out the elderly victims' bank accounts is discovered. In one implementation, using an interface provided by the human expert adaptation engine 354, may define set of rules that receives monitoring data (e.g., a transaction) and executes a party rule (or a set rules across multiple vectors) to determine whether the sender in the transaction may be someone 65 or older and a geo rule (or a set rules across multiple vectors) to determine whether the recipient is an account or party associated with the Dominican Republic, and if both rules are positive, stops the transaction.

In some implementations, the human expert adaptation engine 354 provides a rule tuner. In some implementations, the rule tuner applies a new schema and/or rule to a set of historic data to illustrate the effect the rule(s) would have had. For example, the set of the rules in the above example, may be input and the human expert adaptation engine 354 may indicate how many times a transaction would have been stopped over one or more of the last week, 30 days, quarter, and year, if the rule set was in effect. In some implementations, the human expert adaptation engine 354 may indicate how many times a transaction went through that would have been stopped if the rule set were in effect. It should be recognized that the latter may be an important indicator as to whether such a rule set is necessary, or worth implementing, e.g., because the activity sought to be stopped is already thwarted by another rule set. Existing systems do not have such a tool to recognize outcome or rule redundancies, accordingly their rule sets tend to grow uncontrolled over and performance suffers. For example, an existing system may execute 10,000 rules, while the system and method described herein may execute 2,000 well-written rules and obtain similar results.

The period of the historic data may vary based on the implementation. For example, the historic data may be a day, a week, a month, a quarter, a year, five years, etc. In some implementations, the historic data for different data sets 232-282 may vary. For example, the historic transaction data 232 used in rule tuning may be a 30-day period, but the accounts data 242 may be for the last year.

In some implementations, the rule tuner of the human expert adaptation engine 354 may implement the rule set in a passive mode. In passive mode, the rule set executes as new monitoring data is received, and the final action (i.e., stop the transaction to the Dominican Republic) is not performed based on execution of the passive rule, but the execution of the passive rule set is tracked and presented, upon request, to a user so that the user can determine whether the rule should be changed to a live/active status. In some implementations, the tracking may indicate whether the final action of the passive rule set occurred, e.g., based on a different, active rule set, which could indicate the passive rule set is redundant.

In some implementations, the human expert adaptation engine 354 may modify a schema, e.g., of one or more of the accounts data 242, the party data 252, and positions data 272, to include beneficiary information if not already present. For example, the human expert adaptation engine 354 is communicatively coupled to the schema customizer 324 to make the modification to the schema.

Example Methods

FIGS. 4-8 are flowcharts of example methods 400-800 that may, in accordance with some implementations, be performed by the systems described above with reference to FIGS. 1-3. The methods 400, 500, 600, 700, and 800 of FIGS. 4-8 are provided for illustrative purposes, and it should be understood that many variations exist and are within the scope of the disclosure herein.

Figure 4:
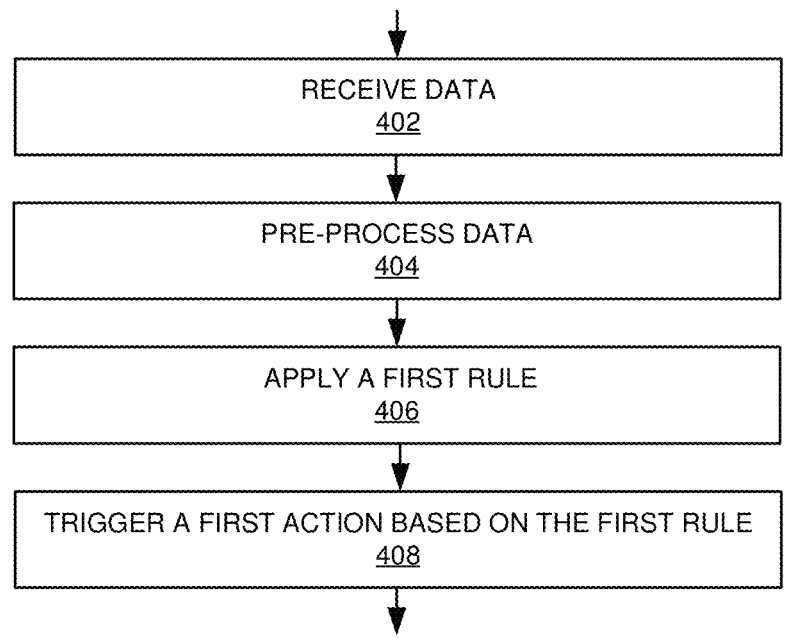
FIG. 4 illustrates a flowchart of an example method for suspicious activity identification in accordance with some implementations.

FIG. 4 illustrates a flowchart of an example method 400 for suspicious activity identification in accordance with some implementations. At block 402, the data manager 302 receives data. At block 404, the data manager 302 preprocess data. At block 406, the multi-vector rule engine 304 applies a first rule. At block 408, the action engine 344 triggers a first action based on the first rule.

Figure 5:
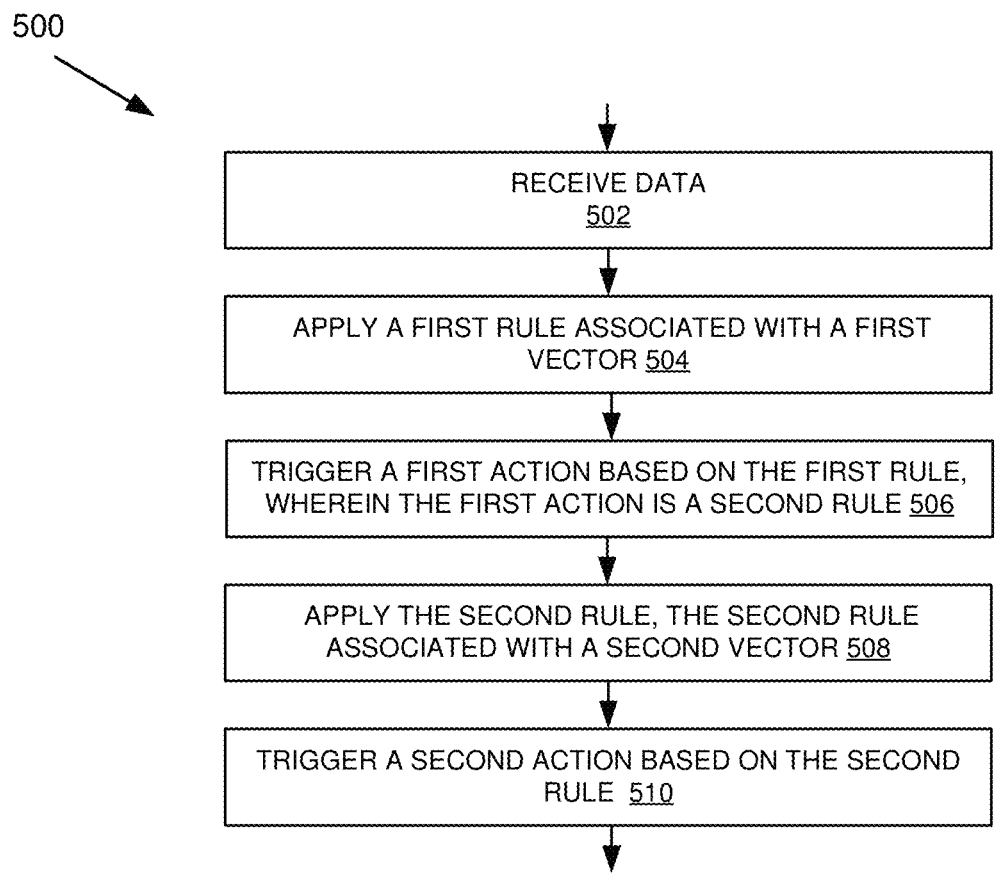
FIG. 5 illustrates a flowchart of an example method for multi-vector suspicious activity identification in accordance with some implementations.

FIG. 5 is a flowchart of an example method 500 for multi-vector suspicious activity identification in accordance with some implementations. At block 502, the data manager 302 receives data. At block 504, the multi-vector rule engine 304 applies a first rule associated with a first vector. At block 506, the action engine 344 triggers a first action based on the first rule, wherein the first action is a second rule. At block 508, the multi-vector rule engine 304 applies the second rule, the second rule associated with a second vector. At block 510, the action engine 344 triggers a second action based on the second rule.

Figure 6:
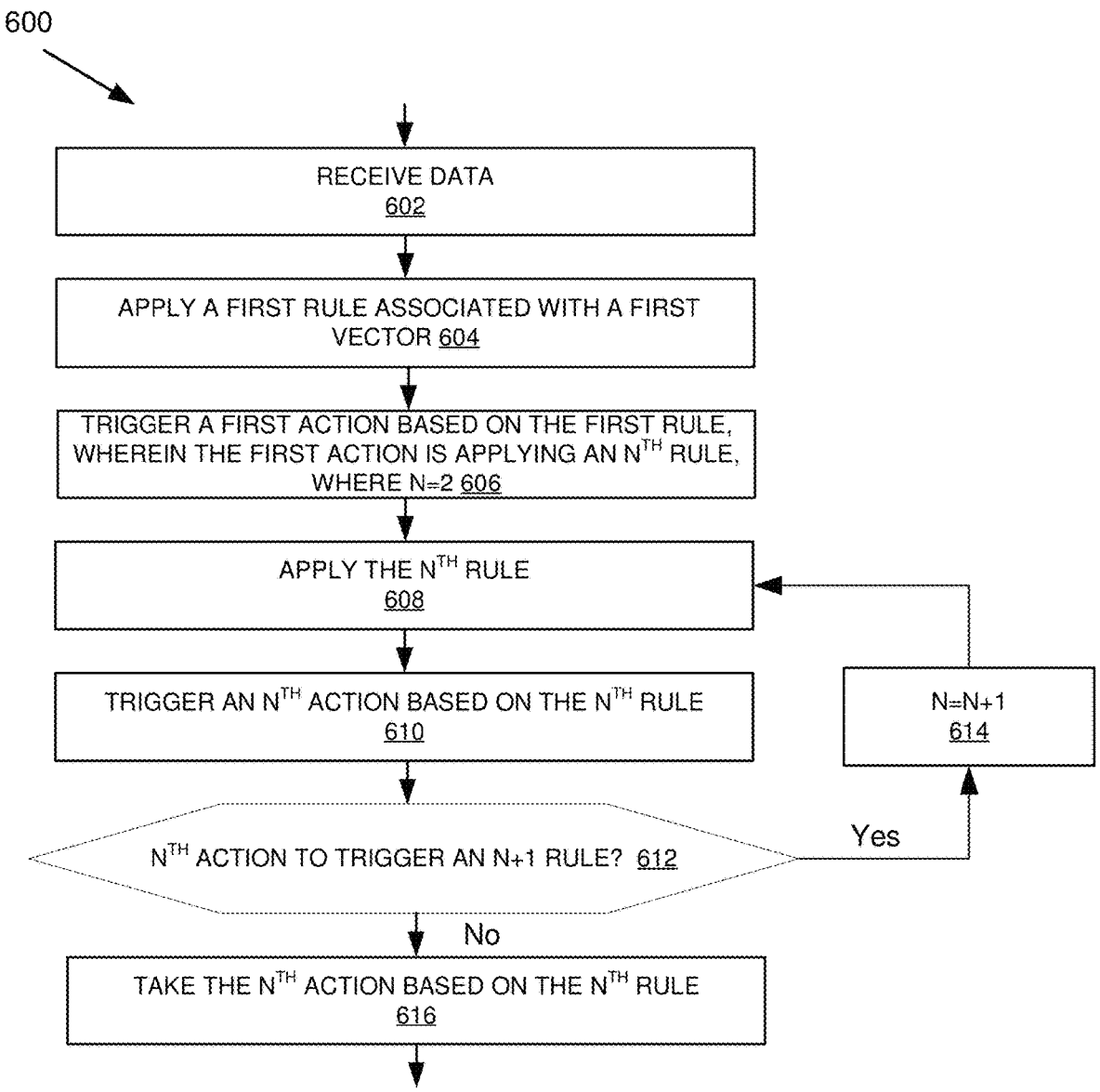
FIG. 6 illustrates flowchart of an example method for taking an action based on one or more rules across one or more vectors in accordance with some implementations.

FIG. 6 is a flowchart of an example method 600 for taking an action based on one or more rules across one or more vectors in accordance with some implementations. At block 602, the data manager 302 receives data. At block 604, the multi-vector rule engine 304 applies a first rule associated with a first vector. At block 606, the action engine 344 triggers a first action based on the first rule, wherein the first action is applying an $N^{th}$ rule where N=2. At block 608, the multi-vector rule engine 304 applies the $N^{th}$ rule. At block 610, the action engine 344 triggers an action based on the $N^{th}$ rule. At block 612, the action engine 344 determines whether the $N^{th}$ action is to trigger an N+1 rule. When the $N^{th}$ action is to trigger another rule (i.e., an N+1 rule) (612—Yes), the action engine 344, at block 614, increments to the next rule (N=N+1), and the method 600 returns to block 608, where the multi-vector rule engine 304 applies the $N^m$ rule. Blocks 608-614, may be repeated until the $N^m$ action is something other than to a trigger another (i.e., N+1 rule).

Figure 7:
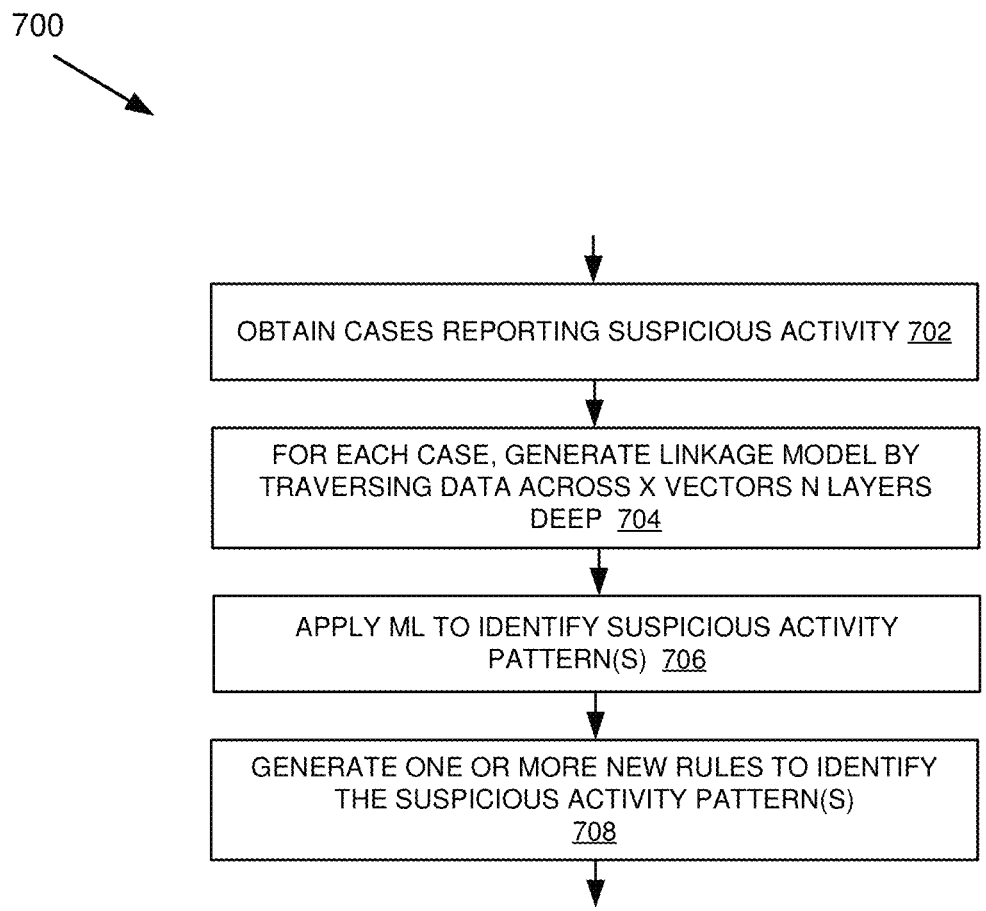
FIG. 7 illustrates a flowchart of an example method for generating a new rule set based on machine learning in accordance with some implementations.

FIG. 7 is a flowchart of an example method 700 for generating a new rule set based on machine learning in accordance with some implementations. At block 702, the suspicious pattern machine learning engine 352 obtains cases reporting suspicious activity. At block 704, the suspicious pattern machine learning engine 352 generates, for each case, a linkage model by traversing data across X vectors N layers deep. At block 706, the suspicious pattern machine learning engine 352 applies machine learning to identify suspicious activity pattern(s).

Figure 8:
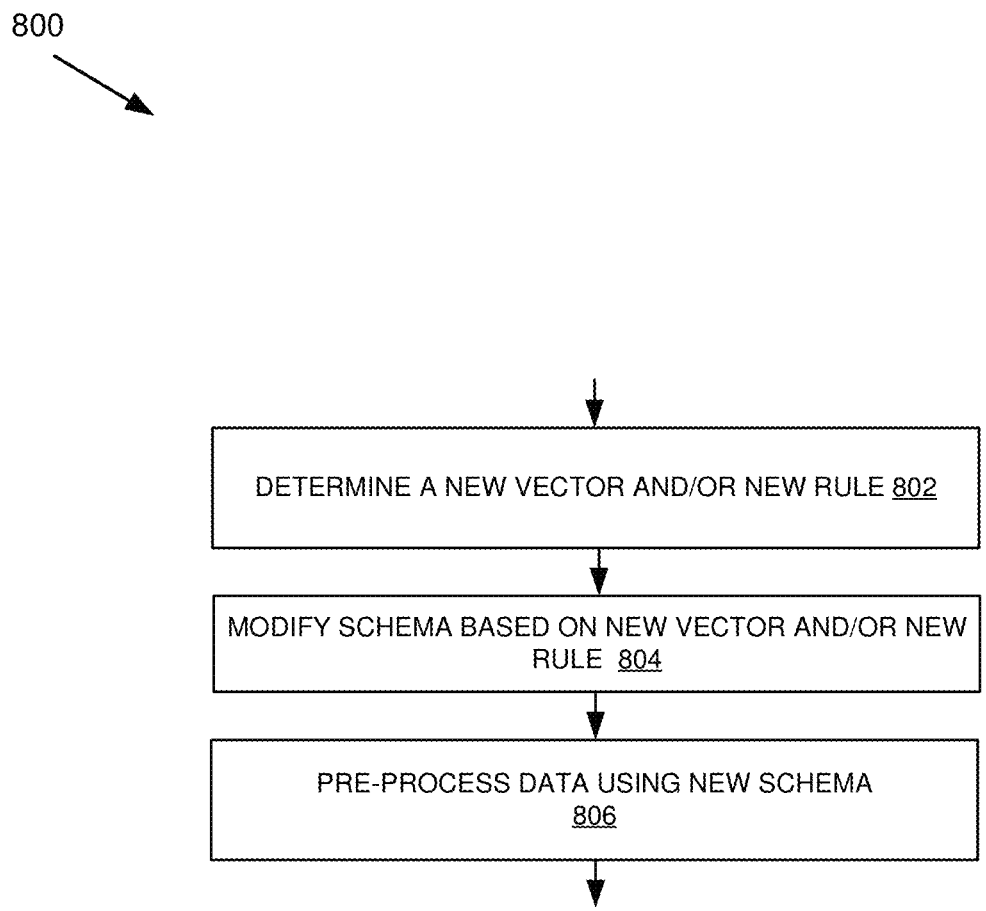
FIG. 8 illustrates a flowchart of an example method for modifying a schema in accordance with some implementations.

FIG. 8 is a flowchart of an example method 800 for modifying a schema in accordance with some implementations. At block 802, the adaptation engine 306 determines a new vector and/or new rule. At block 804, the schema customizer modifies a schema based on the new vector and/or new rule determined at block 802. At block 806, the data manager 302, or one or more subcomponents 312-322 thereof, pre-process the data using a new schema.

Other Considerations

It should be understood that the above-described examples are provided by way of illustration and not limitation and that numerous additional use cases are contemplated and encompassed by the present disclosure. In the above description, for purposes of explanation, numerous specific details are set forth in order to provide a thorough understanding of the present disclosure. However, it should be understood that the technology described herein may be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one implementation" or "an implementation" or "some implementations" means that a particular feature, structure, or characteristic described in connection with the implementation is included in at least one implementation. The appearances of the phrase "in some implementations" in various places in the specification are not necessarily all referring to the same implementations.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As should be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies, engines, and other aspects of the disclosure can be implemented as software, hardware, firmware, or any combination of the foregoing. Also, wherever an element, an example of which is a module, of the specification is implemented as software, the element can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer implemented method comprising:
   receiving, using one or more processors, monitoring data from a plurality of disparate sources, the monitoring data including a first portion of the monitoring data that describes a first set of one or more transactions but does not share a common schema;
   preprocessing, using one or more processors, the monitoring data based on a plurality of vector types, the plurality of vector types including a transaction vector type and one or more different vector types, wherein the preprocessing includes applying a common vector-type-specific schema to the first portion of the monitoring data describing the first set of one or more transactions;
   generating, using the one or more processors, a first vector, wherein the first vector is of the transaction vector type and represents the first set of one or more transactions based on the first portion of the monitoring data;
   generating, using the one or more processors, a second vector, wherein the second vector is of a different vector type from the transaction vector type, and the second vector is based on data that is at least partially distinct from the first portion of the monitoring data;
   applying, using the one or more processors, a first rule associated with the second vector;
   determining, using the one or more processors and based on the application of the first rule, a presence of suspicious activity, wherein the first vector, representing the first set of one or more transactions, is unsuspicious in isolation, but one or more of the second vector and a combination of the first vector and second vector is determined to be suspicious;
   triggering, using the one or more processors, a first action based on the first rule and the determined presence of suspicious activity;
   traversing a first set of vectors a number of layers deep, the first set of vectors describing the first set of one or more transactions;
   generating a linkage model based on traversing the first set of vectors the number of layers deep; and
   identifying a pattern indicative of a wash cycle.

2. The computer implemented method of claim 1, wherein the preprocessing of the monitoring data based on the plurality of vector types comprises:
   generating one or more vector-specific monitoring features based on the monitoring data.

3. The computer implemented method of claim 1, wherein the different vector type of the second vector is one of: an account vector, a party vector, a payment source vector, a position vector, and a location vector.

4. The computer implemented method of claim 1, wherein the first action triggers a second rule, the method further comprising:
   triggering a second action based on the second rule; and
   generating one or more vector-specific monitoring features based on the monitoring data.

5. The computer implemented method of claim 1 further comprising:
   receiving a modification including a new rule set associated with one or more vectors;
   applying the new rule set to historic data; and
   determining a number of times the new rule set triggered.

6. The computer implemented method of claim 5, wherein determining the number of times the new rule set triggered determines a number of times the new rule set creates a different result.

7. The computer implemented method of claim 1 further comprising:
   receiving a modification including a new rule set associated with one or more vectors;
   passively applying the new rule set to incoming monitoring data associated; and
   determining a number of times the new rule set triggered.

8. The computer implemented method of claim 7, wherein determining the number of times the new rule set triggered determines a number of times the new rule set creates a different result.

9. A system comprising:
a processor; and
a memory, the memory storing instructions that, when executed by the processor, cause the system to:
- receive monitoring data from a plurality of disparate sources, the monitoring data including a first portion of the monitoring data that describes a first set of one or more transactions but does not share a common schema;
- preprocess the monitoring data based on a plurality of vector types, the plurality of vector types including a transaction vector type and one or more different vector types, wherein the preprocessing includes applying a common vector-type-specific schema to the first portion of the monitoring data describing the first set of one or more transactions;
- generate a first vector, wherein the first vector is of the transaction vector type and represents the first set of one or more transactions based on the first portion of the monitoring data;
- generate a second vector, wherein the second vector is of a different vector type from the transaction vector type, and the second vector is based on data that is at least partially distinct from the first portion of the monitoring data;
- apply a first rule associated with the second vector;
- determine, based on the application of the first rule, a presence of suspicious activity, wherein the first vector, representing the first set of one or more transactions, is unsuspicious in isolation, but one or more of the second vector and a combination of the first vector and second vector is determined to be suspicious;
- trigger a first action based on the first rule and the determined presence of suspicious activity;
- traverse a first set of vectors a number of layers deep, the first set of vectors describing the first set of one or more transactions;
- generate a linkage model based on traversing the first set of vectors the number of layers deep; and
- identify a pattern indicative of a wash cycle.

10. The system of claim 9, wherein the instructions that, when executed by the processor, cause the system to preprocess of the monitoring data based on the plurality of vector types further cause the system to:
- generate one or more vector-specific monitoring features based on the monitoring data.

11. The system of claim 9, wherein the different vector type of the second vector is one of: an account vector, a party vector, a payment source vector, a position vector, and a location vector.

12. The system of claim 9, wherein the first action triggers a second rule, the instructions that, when executed by the processor, cause the system to:
- trigger a second action based on the second rule; and
- generate one or more vector-specific monitoring features based on the monitoring data.

13. The system of claim 9, the memory further stores instructions that, when executed by the processor, cause the system to:
- receive a modification including a new rule set associated with one or more vectors;
- apply the new rule set to historic data; and
- determine a number of times the new rule set triggered.

14. The system of claim 13, wherein determining the number of times the new rule set triggered determines a number of times the new rule set creates a different result.

15. The system of claim 9, the memory further stores instructions that, when executed by the processor, cause the system to:
- receive a modification including a new rule set associated with one or more vectors;
- passively apply the new rule set to incoming monitoring data associated; and
- determine a number of times the new rule set triggered.

16. The system of claim 15, wherein determining the number of times the new rule set triggered determines a number of times the new rule set creates a different result.

* * * * *